Figure 3:
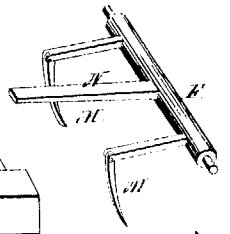
Figure 1:
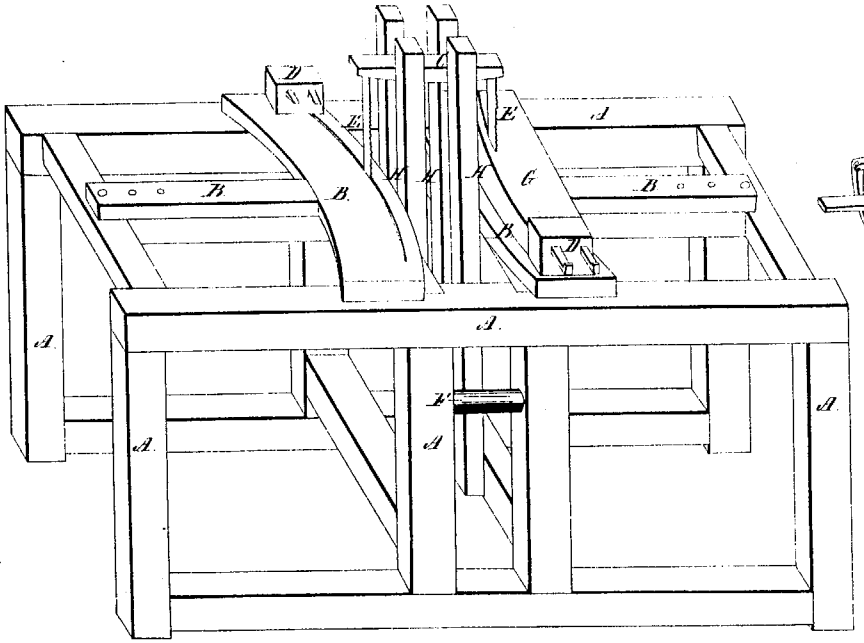
Figure 2:
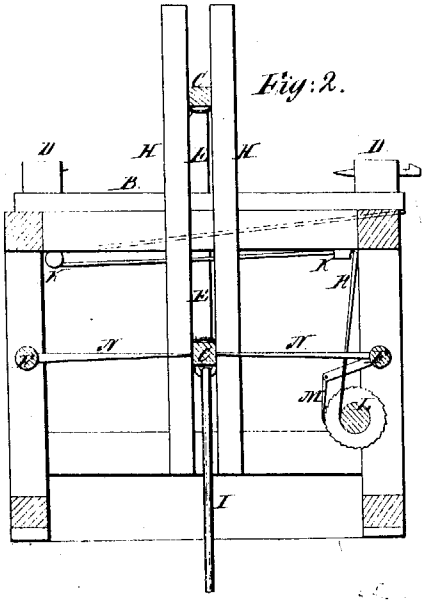

BEST AVAILABLE COPY

W. W. Forwood,

Making Felloes.

Patented Nov. 19, 1833.

7804x

AM. PHOTO-LITHO. CO. N.Y. (OSBORNE'S PROCESS)

W^m H Forwood Harford Maryland

7804X

Letters Patent

The Schedule referred to in these Letters Patent and making part of the same containing a description in the words of the said William H Forwood himself of his improvement in the machine for sawing fellies for carriage wheels chair tops shingles tenoning [illegible] and other curved or straight work ........

Be it known that I William H Forwood of Harford County State of Maryland have made an improvement in the machine for sawing fellies for carriage wheels, chair tops, shingles, tenoning [illegible], and other curved or straight work which is described as follows. —

The frame is made of timber ten feet long four feet high & two feet ten inches wide with eight posts each 4 by 5 inches thick the four inside ones placed nine inches apart, mortised into the top plates & the sills. Two boards one foot wide & two inches thick are let into the top plates crosswise over the inside posts placed nine inches apart for the carriage to slide on. An end tie is mortised into each top plate three or four inches from the end. A piece of timber is mortised into the end tie one end in the centre thereof each & the other end joined to the boards which support the carriage. ....

The carriage is in the shape of a segment of a circle with the point cut off on which is fixed a head block near each end to receive a dog for holding ~~[illegible]~~ the block of timber to be sawed which dog can be driven into the block by a wedge or otherwise. A tongue is let into the centre of the chord of the carriage with holes in it at different distances thro either of which a pin can be inserted into the piece of timber for the purpose of varying the size of the circle....

A slit is made in the carriage four inches from the arc and parallel with it for the saw to run thro. A cord is attached to one of the carriage passing around two pulleys and on a third one down to the rag wheel. There are four fender posts six feet long and two and a half inches square for the saw frame to work in set supporting four Drawn

7804X apart to allow the arms of the saw frame to work freely thro. The saw frame is nine inches wide and three feet long, with an arm two feet six inches long, extending between the fender posts to receive a saw at each end perpendicular to the slit in each carriage. There is a roller on each side extending from one inside post to the other, to each of which is attached a tongue: the end of one is attached to the saw frame & the end of the other in a mortise to regulate the feed. On one of the rollers is a tongue, placed on each side of the centre tongue to which are attached iron palls to work the rag wheel. —

The machine is operated in the usual manner by a [illegible] crank shaft with pulley & bands or cog wheels For a further illustration of my invention I refer to the model and drawing of the same deposited in the Patent office —

Now what I claim as my invention and desire to secure by letters Patent is the Construction and arrangement of the several parts of the above described machine for sawing fellies &c but not the parts themselves —

In testimony whereof I hereunto subscribe my name this 18 day of September 1833

Witnesses
Wm P Elliot
Saml. P. Walker

William W. [illegible]

(Patented 19 Nov 1833)

690 [illegible]

[illegible]